(12) United States Patent
Xu et al.

(10) Patent No.: US 9,451,595 B2
(45) Date of Patent: Sep. 20, 2016

(54) METHODS AND APPARATUS FOR TDD RECONFIGURATION

(71) Applicant: QUALCOMM Incorporated, San Diego, CA (US)

(72) Inventors: Hao Xu, San Diego, CA (US); Wanshi Chen, San Diego, CA (US); Peter Gaal, San Diego, CA (US); Stefan Geirhofer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 13/870,927

(22) Filed: Apr. 25, 2013

(65) Prior Publication Data

US 2013/0286904 A1    Oct. 31, 2013

(51) Int. Cl.
| | | |
|---|---|---|
| H04J 3/16 | (2006.01) | |
| H04W 72/04 | (2009.01) | |
| H04L 1/00 | (2006.01) | |
| H04L 1/18 | (2006.01) | |
| H04L 5/00 | (2006.01) | |
| H04L 5/14 | (2006.01) | |

(52) U.S. Cl.
CPC ........ *H04W 72/0406* (2013.01); *H04L 1/0026* (2013.01); *H04L 1/0027* (2013.01); *H04L 1/1845* (2013.01); *H04L 5/001* (2013.01); *H04L 5/1469* (2013.01); *H04L 1/0003* (2013.01); *H04L 1/0009* (2013.01); *H04L 5/0048* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 9,119,097 B2 * | 8/2015 | Chatterjee | H04W 28/02 |
| 2010/0067410 A1 * | 3/2010 | He | H04L 5/0007 370/280 |
| 2011/0058505 A1 | 3/2011 | Pan et al. | |
| 2011/0149774 A1 * | 6/2011 | Chen | H04L 1/1887 370/252 |
| 2011/0200143 A1 * | 8/2011 | Koo | H04B 7/0697 375/299 |
| 2011/0292847 A1 | 12/2011 | Yoon et al. | |
| 2012/0230245 A1 | 9/2012 | Ostergaard et al. | |
| 2012/0257524 A1 | 10/2012 | Chen et al. | |

(Continued)

FOREIGN PATENT DOCUMENTS

WO    2012142761 A1    10/2012

OTHER PUBLICATIONS

International Search Report and Written Opinion—PCT/US2013/038515, International Search Authority—European Patent Office, Feb. 12, 2014.

(Continued)

*Primary Examiner* — Kevin C Harper
(74) *Attorney, Agent, or Firm* — Arent Fox LLP

(57) ABSTRACT

Transmission of control data by a user equipment (UE) in circumstances following a TDD subframe reconfiguration from an evolved node B (eNB) may result in a conflict with a scheduled transmission of the control data. In one example, a UE may modify periodicity, content, priority, or other aspects of channel state information (CSI) or sounding reference signals (SRS) to resolve any conflicts resulting from a TDD subframe reconfiguration and to ensure transmission of the CSI or SRS. In another example, a UE may detect a hybrid automatic repeat request (HARQ) conflict resulting from a TDD subframe reconfiguration. In such example, the UE may determine and apply a HARQ soft buffer size for a HARQ process or determine and apply a codebook size for a HARQ process in carrier aggregation to resolve such HARQ conflict.

35 Claims, 15 Drawing Sheets

(56) References Cited

U.S. PATENT DOCUMENTS

| | | | |
|---|---|---|---|
| 2012/0327821 A1 | 12/2012 | Lin et al. | |
| 2013/0044651 A1* | 2/2013 | Wang | H04W 72/0406 370/280 |
| 2013/0208678 A1* | 8/2013 | Zhang | H04L 5/0053 370/329 |
| 2014/0160967 A1* | 6/2014 | Gao | H04W 24/10 370/252 |

OTHER PUBLICATIONS

LG Electronics: "Issues in Further Enhancements to L TE TOO", 3GPP Draft; R1-121461 ETDD Issues, 3rd Generation Partnership Project (3GPP), Mobile Competence Centre ; 650, Route Des Lucioles ; F-06921 Sophiaantipolis Cedex ; France, vol. RAN WG1 , No. Jeju, Korea; Mar. 26, 2012-Mar. 30, 2012, Mar. 20, 2012, XP050599742, (retrieved on Mar. 20, 2012).

* cited by examiner

METHODS AND APPARATUS FOR TDD RECONFIGURATION

CROSS-REFERENCE TO RELATED APPLICATION(S)

This application claims the benefit of U.S. Provisional Application Ser. No. 61/639,737, entitled "METHODS AND APPARATUS FOR TDD RECONFIGURATION" and filed on Apr. 27, 2012, which is expressly incorporated by reference herein in its entirety.

BACKGROUND

1. Field

The present disclosure relates generally to communication systems, and more particularly to providing adaptive time division duplexing resource configurations.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

Base stations can configure time division duplexing (TDD) resources for communicating over the uplink and downlink with one or more mobile devices according to an available subframe configuration. In particular, the base station and mobile devices are configured with information of the subframe configurations, which can specify whether a given subframe is used for uplink, downlink, or special (e.g., uplink and/or downlink) communications. Thus, given a specific configuration, the base station and mobile devices can determine whether to transmit or receive data over a given operating frequency based on a selected subframe configuration for the communications. Selection of subframe configurations, however, can be adaptive, meaning that for given communications, the subframe configuration can be different (e.g., a subframe configuration with more downlink transmission opportunities can be chosen for multimedia applications). Allowing such selection of subframe configurations, however, can lead to interference scenarios among base stations or mobile devices and/or conflict for certain communications where a period for transmitting the communications falls on a scheduled subframe for receiving communications in the new subframe configuration.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Described herein are various aspects related to ensuring transmission of control data by a user equipment (UE) in circumstances when a TDD subframe reconfiguration from an evolved node B (eNB) results in a conflict with a scheduled transmission of the control data. In one example, a UE may modify periodicity, content, priority, or other aspects of channel state information (C SI) or sounding reference signals (SRS) to resolve any conflicts resulting from a TDD subframe reconfiguration and to ensure transmission of the CSI or SRS. In another example, a UE may detect a hybrid automatic repeat request (HARQ) conflict resulting from a TDD subframe reconfiguration. In such example, the UE may determine and apply a HARQ soft buffer size for a HARQ process or determine and apply a codebook size for a HARQ process in carrier aggregation to resolve such HARQ conflict. In other examples, different TDD subframe reconfigurations can be selected where a conflict is detected by the current TDD subframe configuration.

In an aspect of the disclosure, a method, a computer program product, and an apparatus are provided. The apparatus may be a UE. The UE may detect a TDD subframe reconfiguration and modify at least one aspect of a CSI or SRS transmission based on the TDD subframe reconfiguration.

In another aspect of the disclosure, a method, a computer program product, and an apparatus are provided. The apparatus may be a UE. The UE may detect a TDD subframe reconfiguration and modify at least a HARQ soft buffer size or a codebook size for a HARQ process based on the TDD subframe reconfiguration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
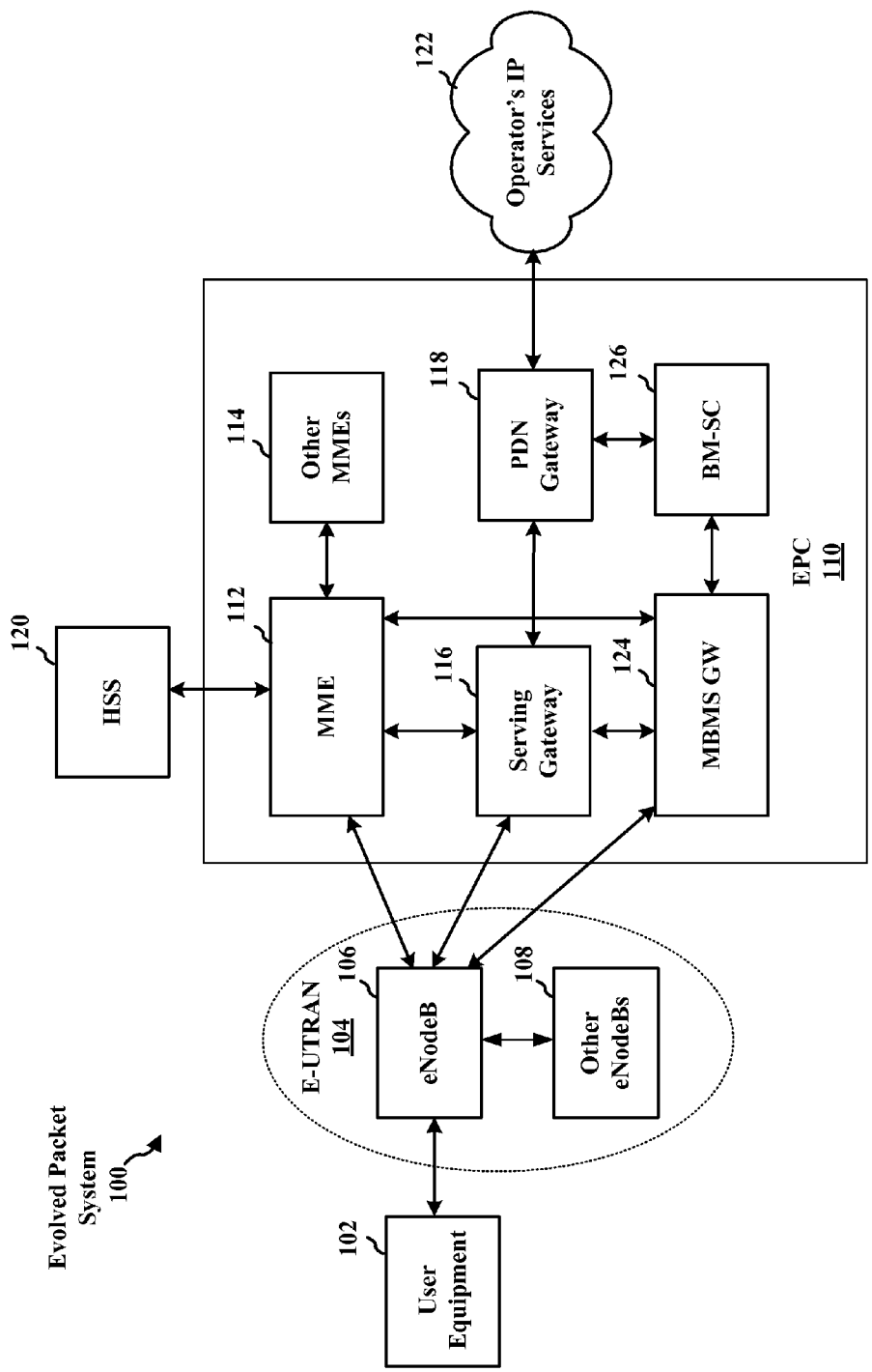
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
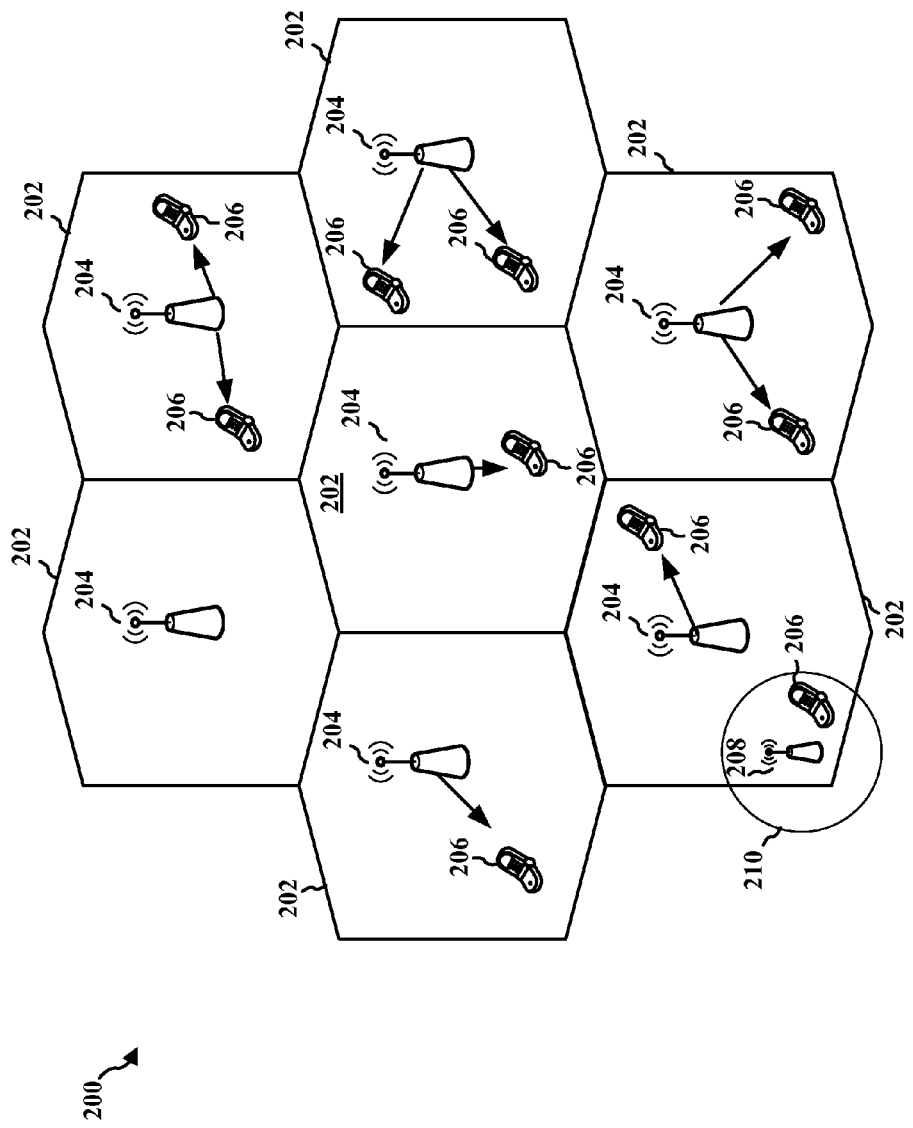
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
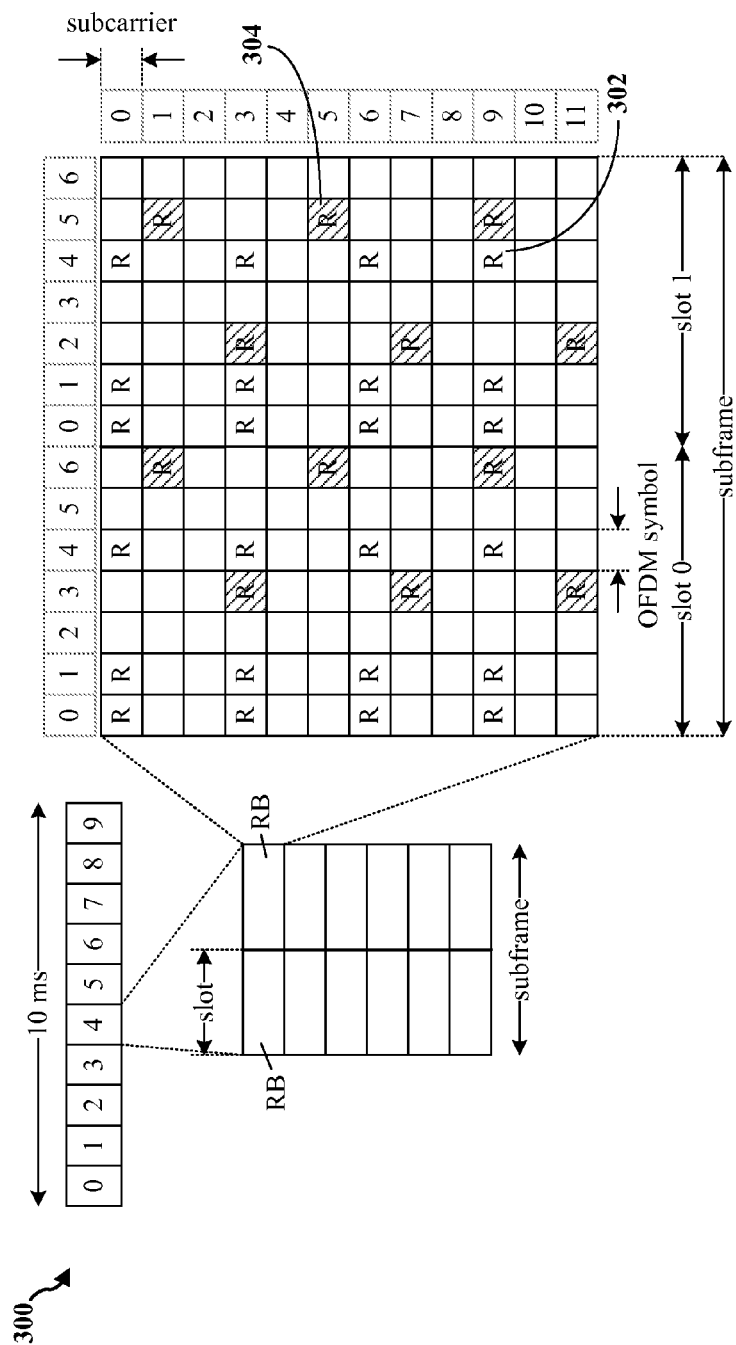
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
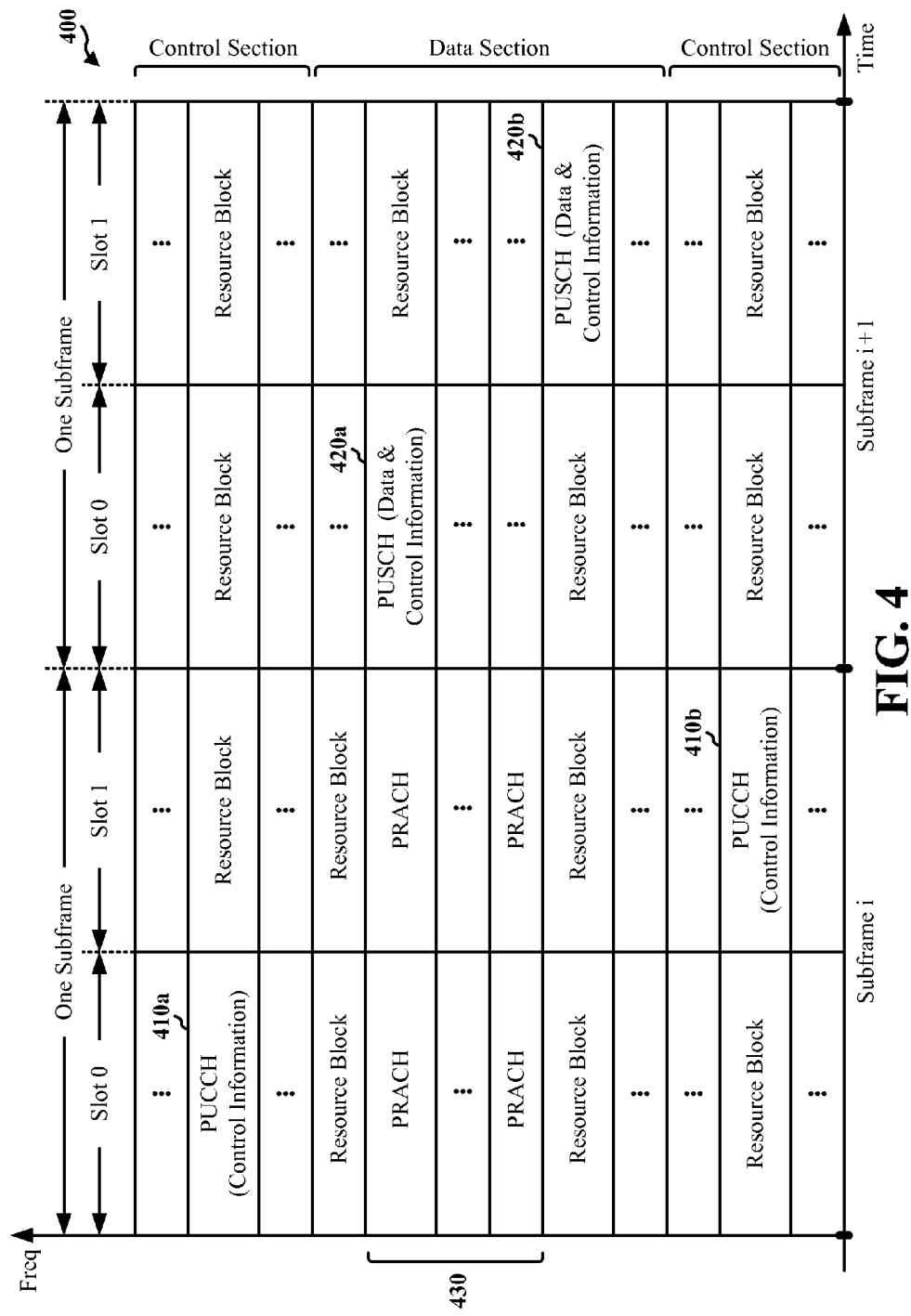
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
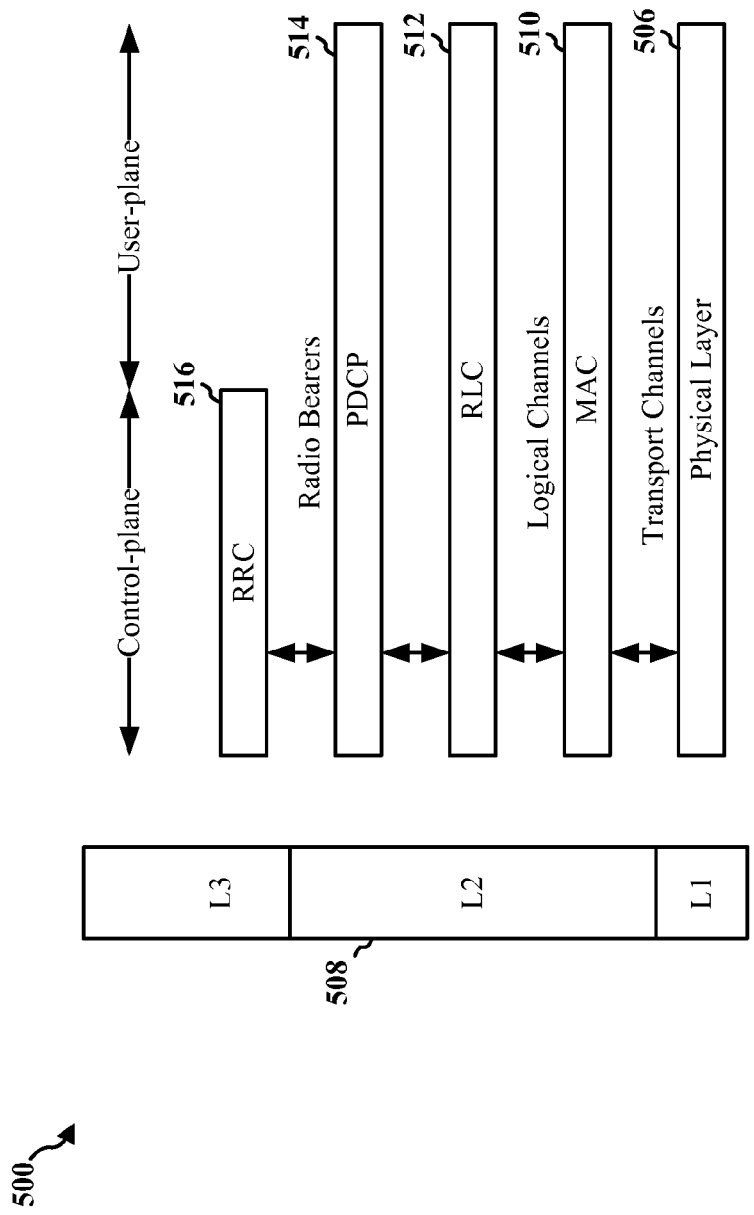
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to HARQ. The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
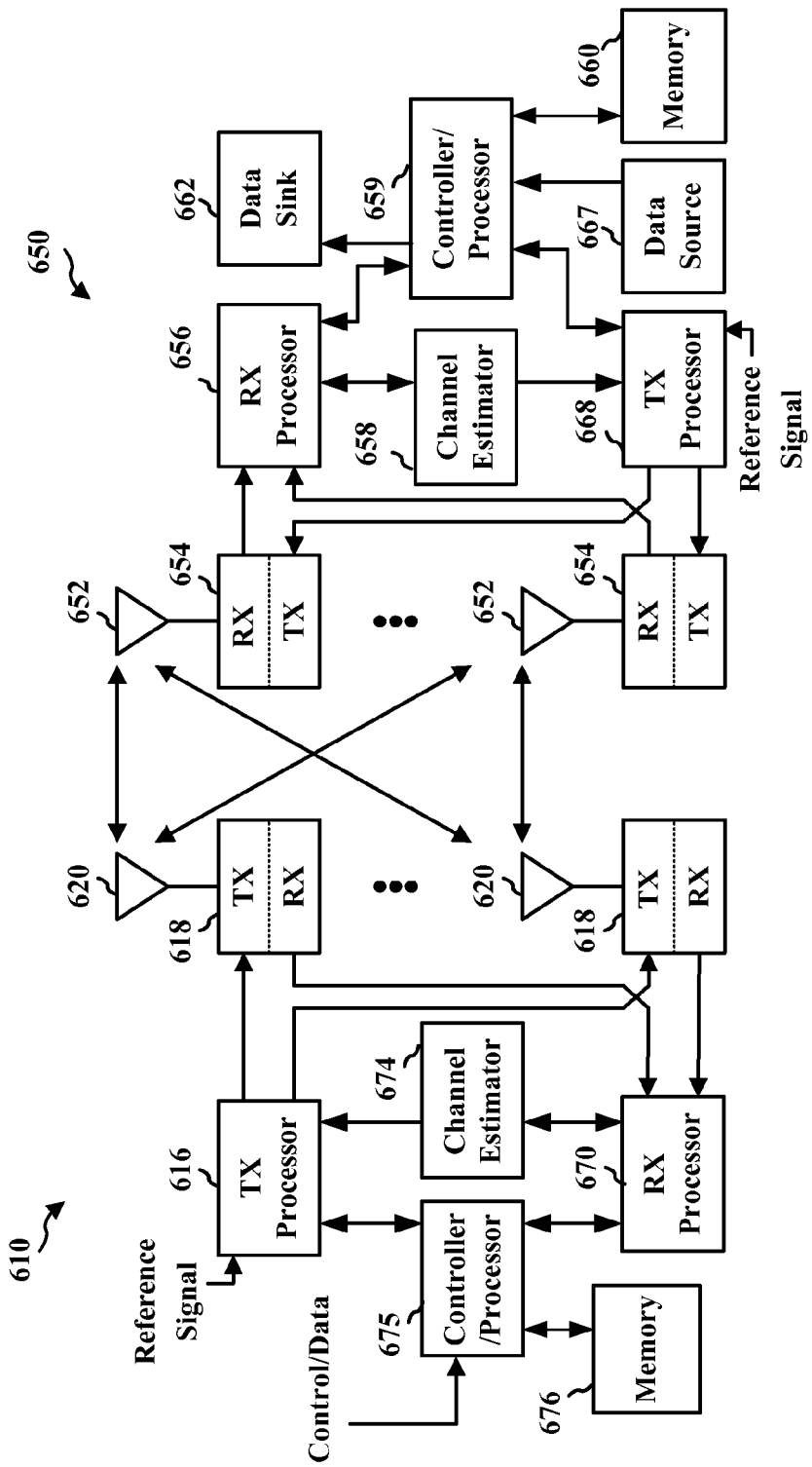
FIG. 6 is a diagram illustrating an example of an evolved Node B (eNB) and user equipment (UE) in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Described herein are various aspects related to ensuring transmission of certain control data in TDD subframe reconfiguration. For example, aspects of control data reported by a UE to an eNB or other control data processes can be configured based on a TDD subframe reconfiguration to ensure transmission of the control data. In an example, TDD subframe reconfiguration can result in incompatible transmission configuration for the control data (e.g., a defined downlink frame in a new TDD subframe configuration where uplink control data was previously scheduled) and/or interference caused to/from other nearby eNBs or UEs over the same frequency using different TDD subframe configurations. For example, periodicity, content, priority, or other aspects of CSI, SRS, or similar information can be modified to facilitate communicating the CSI in TDD subframe reconfiguration. In addition, for example, HARQ retransmission feedback and related downlink HARQ soft buffer management can be modified to facilitate communicating such in TDD subframe reconfiguration. In other examples, different TDD subframe reconfigurations can be selected where a conflict is detected by the current TDD subframe configuration.

The LTE communications standard supports both frequency division duplexing (FDD) and TDD frame structures. The transmission timeline for the downlink and uplink may be partitioned into units of radio frames, and each radio frame may be partitioned into 10 subframes with indices of 0 through 9. LTE supports a number of uplink-downlink configurations for TDD. Subframes 0 and 5 are used for the downlink and subframe 2 is used for the uplink for all uplink-downlink configurations. Subframes 3, 4, 7, 8 and 9 may each be used for the downlink or uplink depending on the uplink-downlink configuration. Subframe 1 is a special subframe composed of a Downlink Pilot Time Slot (DwPTS), a Guard Period (GP), and an Uplink Pilot Time Slot (UpPTS). The DwPTS is used for downlink control channels as well as data transmission. The GP carries no transmissions. The UpPTS is used for either a random access channel (RACH) or SRSs transmissions. Subframe 6 may include only the DwPTS, or all three special fields, or a downlink subframe depending on the uplink-downlink configuration. The DwPTS, GP and UpPTS may have different durations for different subframe configurations. For TDD, subframes used for the downlink only may be referred to as a downlink subframe, and each subframe used for the uplink only may be referred to as an uplink subframe.

Changes to the implementation of the standards include the possibility of dynamically adapting TDD DL/UL subframe configurations based on the actual traffic needs. If, during a short duration, a large data burst on downlink is needed, a wireless apparatus may change its configuration from, for example, configuration #1 (6 DL:4 UL) to configuration #5 (9 DL:1 UL) (See Table 1, below). The adaptation of TDD configuration is expected to be no slower than 640 ms. In the extreme case, the adaptation may be as fast as 10 ms. Having adjacent cells dynamically switching between different subframe uplink-downlink configurations may cause interference to both downlink and uplink when two or more cells have different overlapping downlink and uplink subframes.

Figure 7:
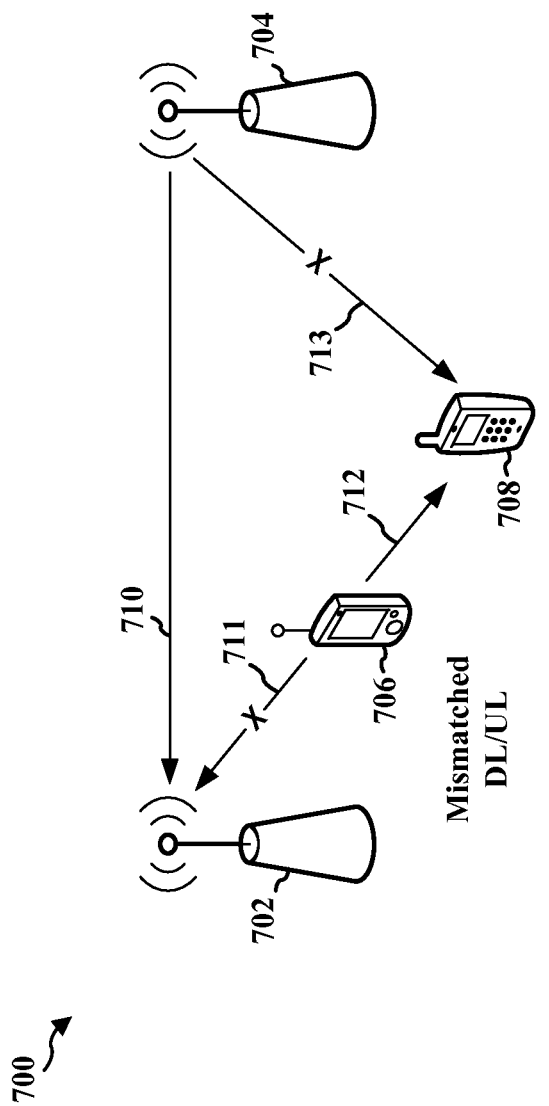
FIG. 7 illustrates an example system that can exhibit eNB-to-eNB interference or UE-to-UE interference.

FIG. 7 illustrates a wireless communication system 700 experiencing eNB-to-eNB or UE-to-UE interference from varying TDD subframe configurations. System 700 includes eNBs 702 and 704 that respectively communicate with UEs 706 and 708. The eNBs 702 and 704 can each be a macrocell, femtocell, picocell, or similar base station, a mobile base station, a relay, a UE (e.g., communicating in peer-to-peer or ad-hoc mode with UEs 706 and/or 708), a portion thereof, and/or the like. UEs 706 and 708 can each be a mobile terminal, a stationary terminal, a modem (or other tethered device), a portion thereof, and/or the like.

The eNB 702 can assign a TDD subframe configuration to UE 706 for communicating therewith. In one example, a plurality of TDD subframe configurations and/or related information can be known at the eNB 702 and UE 706 such that the eNB 702 assigns certain TDD subframe configurations by communicating an identifier to UE 706. Similarly, eNB 704 can assign a TDD subframe configuration for communicating with UE 708. It is to be appreciated that eNBs 702 and 704 may not coordinate TDD subframe configuration assignment, and thus communications over the TDD subframes may cause interference among eNBs 702 and 704 and/or among UEs 706 and 708 where the communications are over the same frequency.

For example, where a TDD subframe configuration of eNB 704 schedules a downlink subframe and eNB 702 schedules the same subframe as uplink, the downlink transmission 710 from eNB 704 can interfere with the uplink transmission 711 from UE 706. Similarly, an uplink transmission 712 from UE 706 can interfere with a downlink transmission 713 from eNB 704 at UE 708 (e.g., where UEs 706 and 708 are near to each other).

Figure 8:
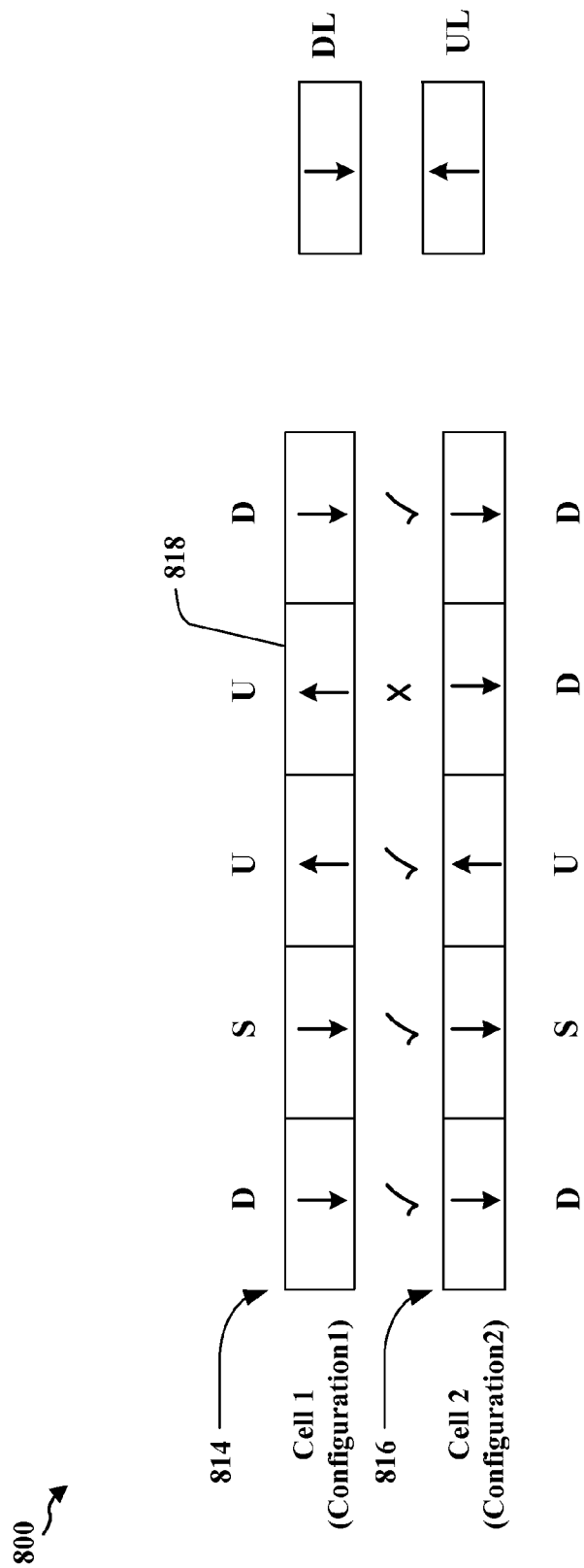
FIG. 8 is a diagram illustrating TDD subframe configurations.

FIG. 8 is a diagram 800 illustrating TDD subframe configurations. For example, eNB 702 in FIG. 7 can assign TDD subframe configuration 814 for communicating with UE 706. Subframes in subframe configuration 814 marked with 'D' corresponds to subframes reserved for downlink transmission from eNB 702 to UE 706, 'U' corresponds to subframes reserved for uplink transmission from UE 706 to eNB 702, 'S' corresponds to special subframes over which downlink or uplink communications are possible, etc. Similarly, eNB 704 can assign TDD subframe configuration 816 for communications with UE 708. The configurations 814 and 816 are different in that at subframe 818, configuration 814 schedules an uplink transmission while configuration 816 schedules a downlink transmission, which can result in the eNB-to-eNB interference or UE-to-UE interference as described above at subframe 818.

Adaptive TDD subframe configurations can be provided by eNBs 702 and 704 for one or more UEs, such as UEs 706 and 708, respectively, to accommodate different types of data, to handle loading at the eNB 702 or 704, and/or the like. Thus, upon switching TDD subframe configurations at eNB 702 or eNB 704 for communications from UE 706 or 708, respectively, various functions can be performed to mitigate such interference caused by allowing adaptive TDD subframe configurations and/or to handle subframe conflicts from one configuration to the next. For example, periodicity, content, priority, or other aspects of CSI, SRS, or similar information can be modified to facilitate communicating the CSI in a given TDD subframe configuration (e.g., based on a previous configuration). In another example, HARQ retransmission feedback and/or downlink HARQ soft buffer management can be modified to facilitate communicating HARQ in a given TDD subframe. In other examples, different TDD subframe configurations can be selected where a conflict or interference is caused by geographically close cells using different TDD subframe configurations.

FIGS. 9 through 14 illustrate example methodologies for modifying control transmissions or processes based on determining TDD subframe reconfigurations. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 9:
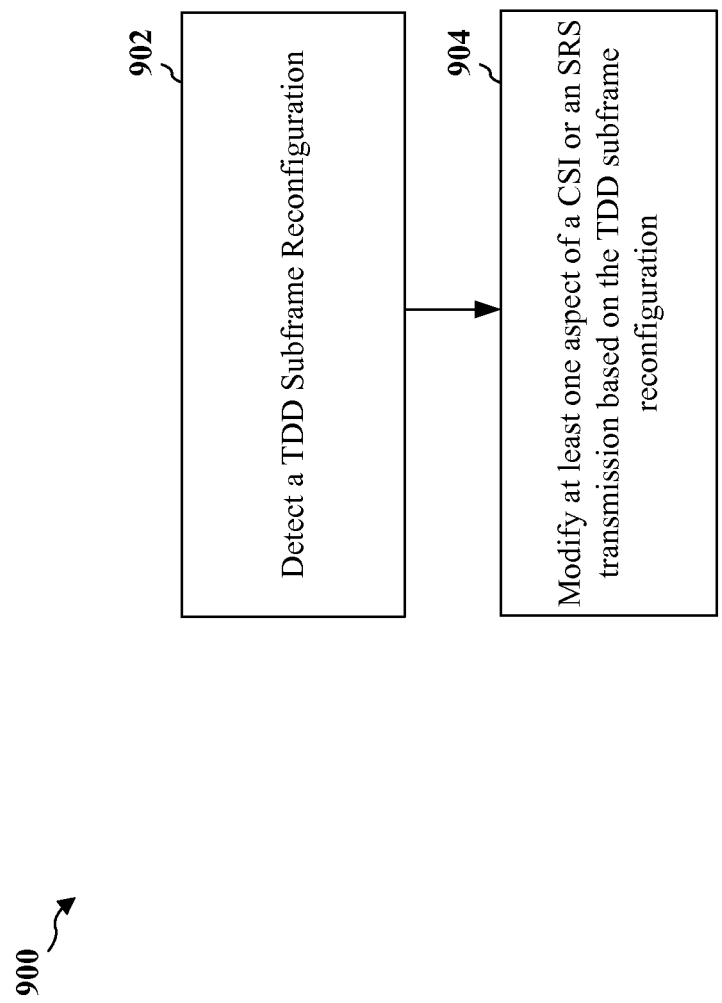
FIG. 9 is a flow chart of a method of wireless communication.

FIG. 9 is a flowchart 900 of a method that facilitates modifying CSI or SRS transmission. The method may be performed by a UE, such as UE 706 or 708 that communicates with one or more eNBs, such as eNBs 702 or 704. At step 902, the UE detects a TDD subframe reconfiguration. For example, this can include receiving an indication from an eNB to switch the TDD subframe configuration. This can be based in part on receiving a new resource allocation from the eNB or otherwise. Allowing such adaptive TDD subframe configuration facilitates selecting TDD subframe configurations based on data demand or types of data being transmitted within a cell.

At step 904, the UE modifies at least one aspect of a CSI or a SRS transmission based on the TDD subframe reconfiguration. For example, the UE may modify a periodicity, content, or priority for transmitting the CSI or SRS transmission. In one example, where a periodicity configured for CSI transmission conflicts with the new TDD subframe configuration, the CSI periodicity can be similarly reconfigured with the TDD subframe reconfiguration. In other examples, transmissions of the CSI that conflict with scheduled subframes of the TDD subframe reconfiguration can be dropped, a next highest or lowest CSI periodicity can be selected, and/or the like.

Figure 10:
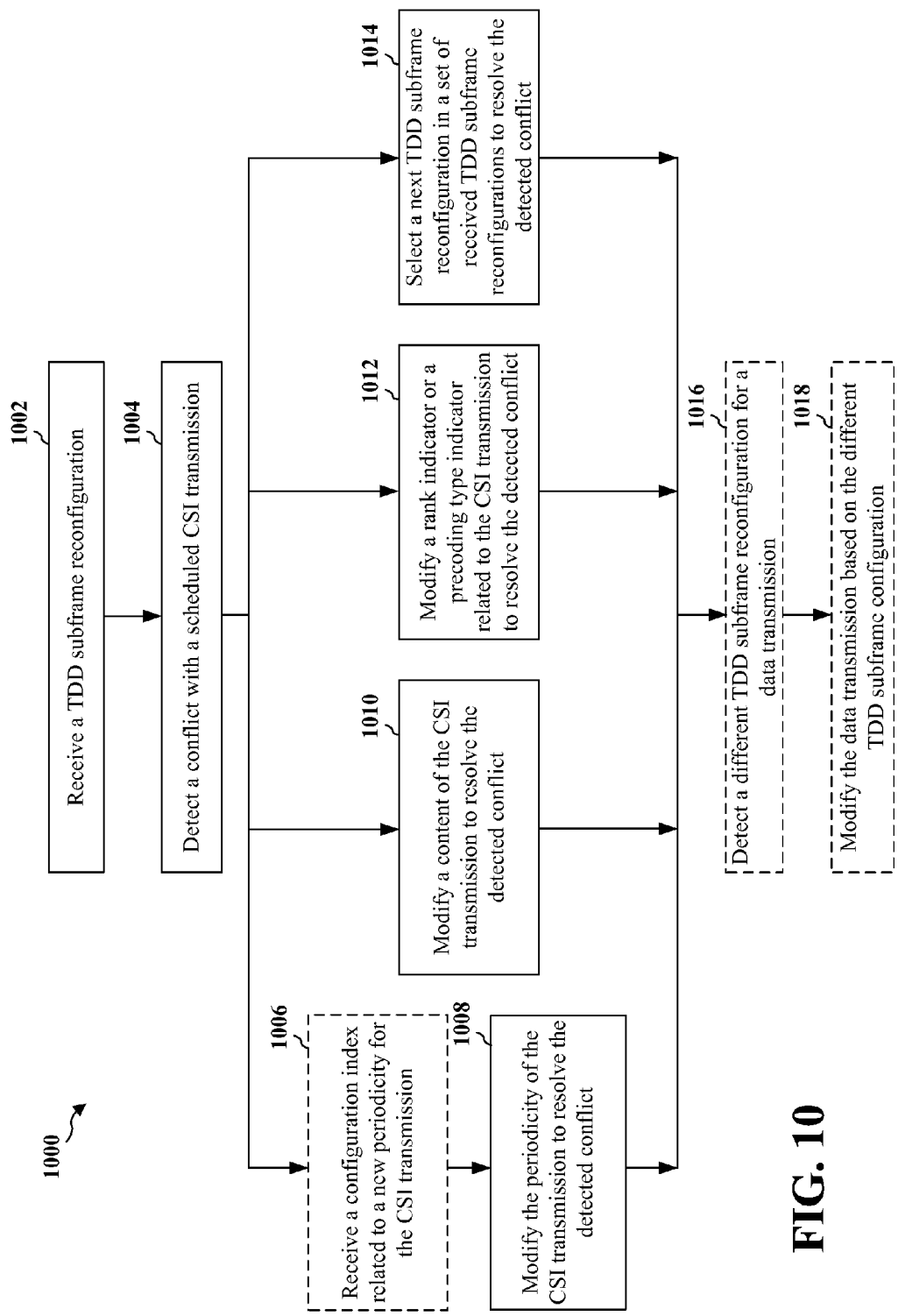
FIG. 10 is a flow chart of a method of wireless communication.

FIG. 10 is a flowchart 1000 of a method that facilitates modifying a CSI transmission. The method may be performed by a UE, such as UE 706 or 708 that communicates with one or more eNBs, such as eNBs 702 or 704. At step 1002, the UE receives a TDD subframe reconfiguration from an eNB. At step 1004, the UE detects a conflict with a scheduled CSI transmission.

It should be understood that the path including steps 1008, 1016, and 1018, the path including steps 1010, 1016, and 1018, the path including steps 1012, 1016, and 1018, and the path including steps 1014, 1016, and 1018 represent alternative mechanisms for resolving a CSI transmission conflict. It should be further understood that any or all of the previously described paths may exclude steps 1016 and 1018. Therefore, a UE implementing the method of flowchart 1000 may perform any of the steps in the previously described paths, with or without steps 1016 and 1018. It should be noted that any of the steps 1008, 1010, 1012, and 1014 may be performed sequentially, in parallel, in various orders, and in various combinations with or without steps 1016 and 1018.

At step 1006, the UE receives a configuration index related to a new periodicity for the CSI transmission. At step 1008, the UE modifies the periodicity of the CSI transmission to resolve the detected conflict. In an aspect, the UE modifies the periodicity of the CSI transmission based on the received configuration index related to the new periodicity. In another aspect, the UE modifies the periodicity of the CSI transmission by dropping at least one instance of the CSI transmission. In another aspect, the UE modifies the periodicity of the CSI transmission by utilizing a configuration corresponding to a next lowest or highest configuration index related to the CSI transmission.

At step 1010, the UE modifies a content of the CSI transmission to resolve the detected conflict. In an aspect, the UE modifies the content of the CSI transmission by computing a subband for transmitting the CSI transmission based on at least one of a TDD subframe configuration before the TDD subframe reconfiguration or a TDD subframe configuration after the TDD subframe reconfiguration.

At step 1012, the UE modifies a rank indicator or a precoding type indicator related to the CSI transmission to resolve the detected conflict. In an aspect, the UE modifies the rank indicator or the precoding type indicator by using at least one of a previous rank indicator or a precoding type indicator from a TDD subframe configuration before the TDD subframe reconfiguration, a previous rank indicator or a precoding type indicator from a TDD subframe configuration after the TDD subframe reconfiguration, a common rank indicator or a precoding type indicator for the TDD subframe reconfiguration, or a lowest allowed rank indicator or a precoding type indicator. At step 1014, the UE selects a next TDD subframe reconfiguration in a set of received TDD subframe reconfigurations to resolve the detected conflict.

At step 1016, the UE detects a different TDD subframe reconfiguration for a data transmission. At step 1018, the UE modifies the data transmission based on the different TDD subframe configuration.

Figure 11:
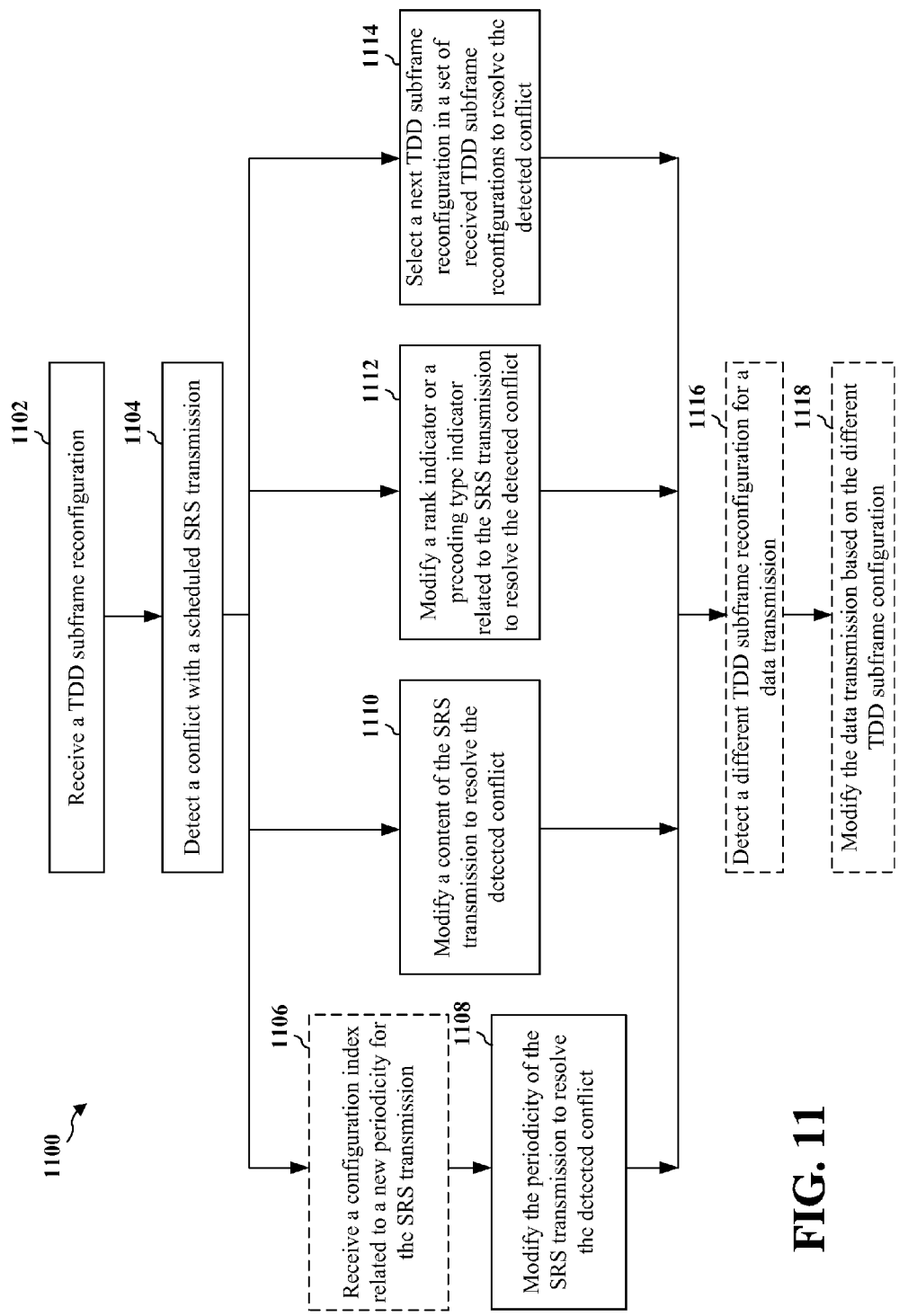
FIG. 11 is a flow chart of a method of wireless communication.

FIG. 11 is a flowchart 1100 of a method that facilitates modifying an SRS transmission. The method may be performed by a UE, such as UE 706 or 708 that communicates with one or more eNBs, such as eNBs 702 or 704. At step 1102, the UE receives a TDD subframe reconfiguration from an eNB. At step 1104, the UE detects a conflict with a scheduled SRS transmission. At step 1106, the UE receives a configuration index related to a new periodicity for the SRS transmission.

It should be understood that the path including steps 1108, 1116, and 1118, the path including steps 1110, 1116, and 1118, the path including steps 1112, 1116, and 1118, and the path including steps 1114, 1116, and 1118 represent alternative mechanisms for resolving an SRS transmission conflict. It should be further understood that any or all of the previously described paths may exclude steps 1116 and 1118. Therefore, a UE implementing the method of flowchart 1100 may perform any of the steps in the previously described paths, with or without steps 1116 and 1118. It should be noted that any of the steps 1108, 1110, 1112, and 1114 may be performed sequentially, in parallel, in various orders, and in various combinations with or without steps 1116 and 1118.

At step 1108, the UE modifies the periodicity of the SRS transmission to resolve the detected conflict. In an aspect, the UE modifies the periodicity of the SRS transmission based on the received configuration index related to the new periodicity. In another aspect, the UE modifies the periodicity of the SRS transmission by dropping at least one instance of the SRS transmission. In another aspect, the UE modifies the periodicity of the SRS transmission by utilizing a configuration corresponding to a next lowest or highest configuration index related to the SRS transmission.

At step 1110, the UE modifies a content of the SRS transmission to resolve the detected conflict. In an aspect, the UE modifies the content of the SRS transmission by computing a subband for transmitting the SRS transmission based on at least one of a TDD subframe configuration before the TDD subframe reconfiguration or a TDD subframe configuration after the TDD subframe reconfiguration.

At step 1112, the UE modifies a rank indicator or a precoding type indicator related to the SRS transmission to resolve the detected conflict. In an aspect, the UE modifies the rank indicator or the precoding type indicator by using at least one of a previous rank indicator or a precoding type indicator from a TDD subframe configuration before the TDD subframe reconfiguration, a previous rank indicator or a precoding type indicator from a TDD subframe configuration after the TDD subframe reconfiguration, a common rank indicator or a precoding type indicator for the TDD subframe reconfiguration, or a lowest allowed rank indicator or a precoding type indicator. At step 1114, the UE selects a next TDD subframe reconfiguration in a set of received TDD subframe reconfigurations to resolve the detected conflict.

At step 1116, the UE detects a different TDD subframe reconfiguration for a data transmission. At step 1118, the UE modifies the data transmission based on the different TDD subframe configuration.

Figure 12:
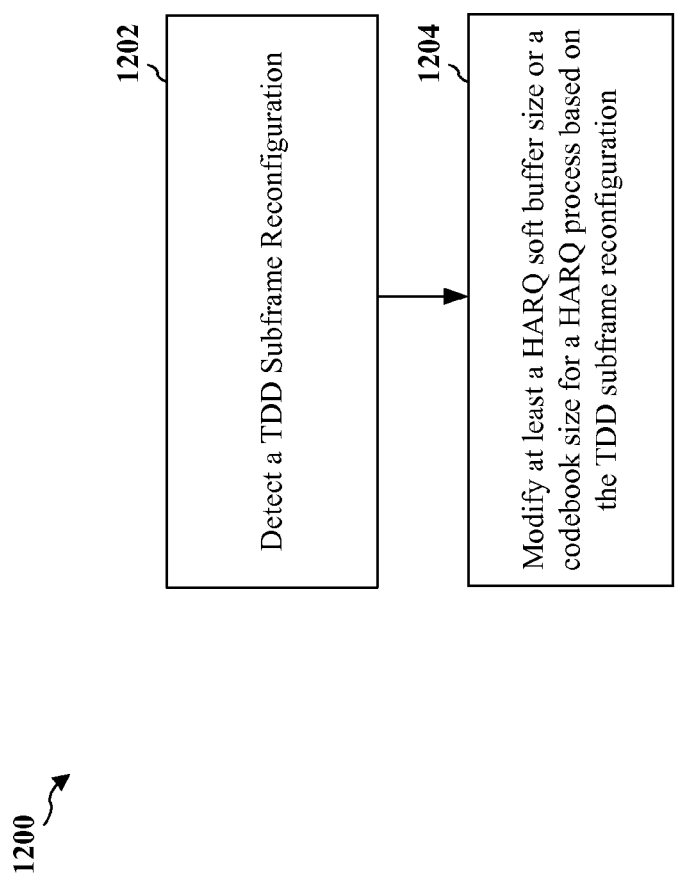
FIG. 12 is a flow chart of a method of wireless communication.

FIG. 12 is a flowchart 1200 of a method for modifying a HARQ process. The method may be performed by a UE, such as UE 706 or 708 that communicates with one or more eNBs, such as eNBs 702 or 704. At step 1202, the UE detects a TDD subframe reconfiguration. For example, this can include receiving by the UE an indication from an eNB to switch the TDD subframe configuration. This can be based in part on receiving a new resource allocation from the eNB or otherwise. Allowing such adaptive TDD subframe configuration facilitates selecting TDD subframe configurations based on data demand or types of data being transmitted at an eNB, etc.

At step 1204, the UE modifies at least a HARQ soft buffer size or a codebook size for a HARQ process based on the TDD subframe reconfiguration. For example, the UE may modify the HARQ soft buffer size by determining the HARQ soft buffer size for the HARQ process based on at least one of a TDD subframe configuration before the TDD subframe reconfiguration or a TDD subframe configuration after the TDD subframe reconfiguration, and applying the determined HARQ soft buffer size. As another example, the UE may modify the HARQ soft buffer size by determining the HARQ soft buffer size for the HARQ process based on a static or semi-static value during transition to the TDD subframe reconfiguration, or based on a dynamic value outside of the TDD subframe reconfiguration, and applying the determined HARQ soft buffer size. For example, the UE may modify the codebook size for a HARQ process by determining the codebook size for the HARQ process in carrier aggregation, and applying the determined codebook size.

Figure 13:
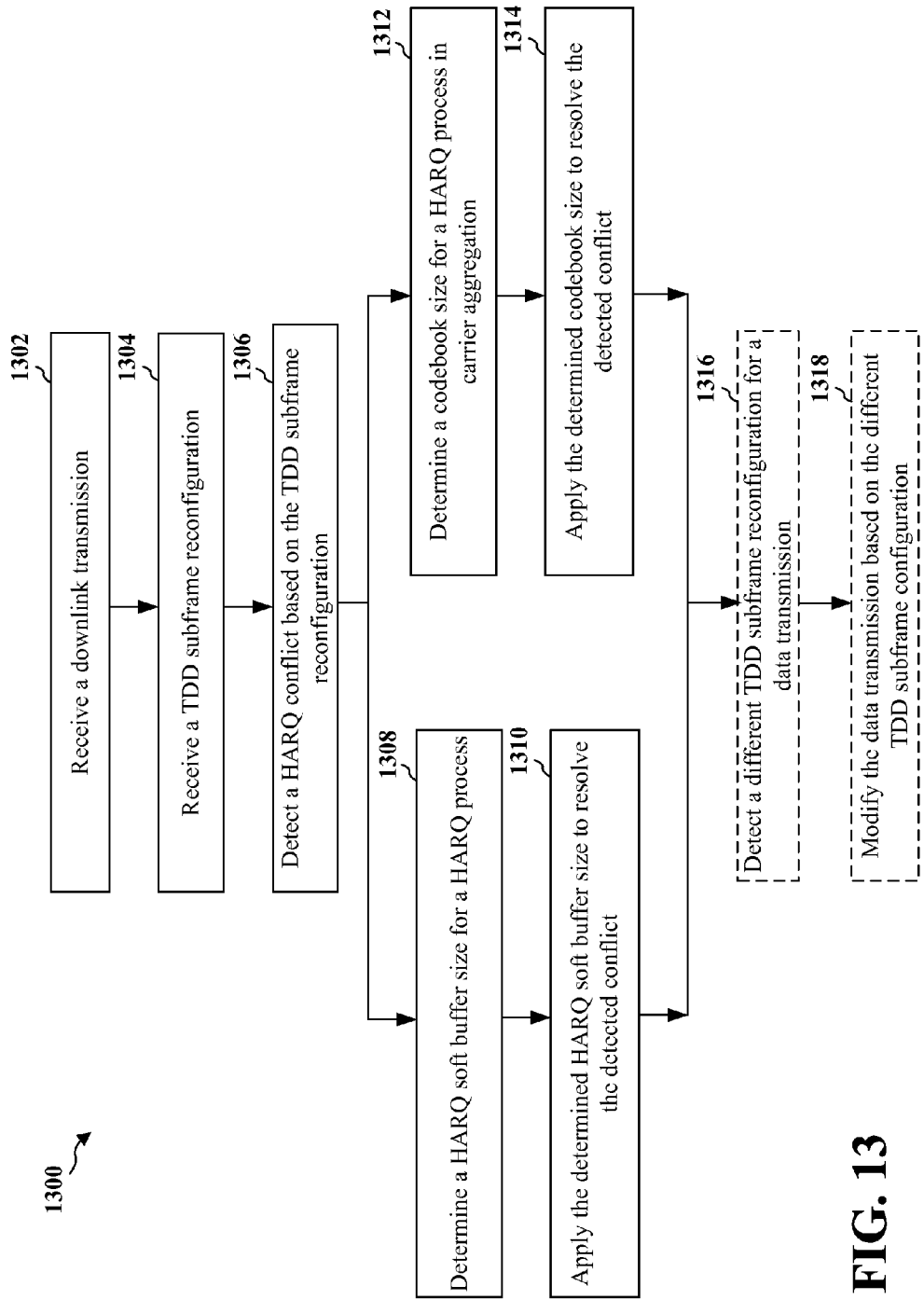
FIG. 13 is a flow chart of a method of wireless communication.

FIG. 13 is a flowchart 1300 of a method for modifying a HARQ process. The method may be performed by a UE, such as UE 706 or 708 that communicates with one or more eNBs, such as eNBs 702 or 704. At step 1302, the UE receives a downlink transmission from an eNB. At step 1304, the UE receives a TDD subframe reconfiguration from the eNB. At step 1306, the UE detects a HARQ conflict based on the reconfiguration. At step 1308, the UE determines a HARQ soft buffer size for a HARQ process. In an aspect, the UE determines the HARQ soft buffer size based on at least one of a TDD subframe configuration before the TDD subframe reconfiguration or a TDD subframe configuration after the TDD subframe reconfiguration. In another aspect, the UE determines the HARQ soft buffer size based on a static or semi-static value during transition to the TDD subframe reconfiguration, or based on a dynamic value outside of the TDD subframe reconfiguration. At step 1310, the UE applies the determined HARQ soft buffer size to resolve the detected conflict.

At step 1312, the UE determines a codebook size for a HARQ process in carrier aggregation. At step 1314, the UE applies the determined codebook size to resolve the detected conflict. At step 1316, the UE detects a different TDD subframe reconfiguration for a data transmission. At step 1318, the UE modifies the data transmission based on the different TDD subframe configuration.

It should be understood that the path including steps 1308, 1310, 1316 and 1318 and the path including steps 1312, 1314, 1316, and 1318 represent alternative mechanisms for resolving a HARQ transmission conflict. It should be further understood that either or both of the previously described paths may exclude steps 1316 and 1318. Therefore, a UE implementing the method of flowchart 1300 may perform any of the steps in the previously described paths, with or without steps 1316 and 1318. It should be noted that any of the steps 1308, 1310, 1312, and 1314 may be performed sequentially, in parallel, in various orders, and in various combinations with or without steps 1316 and 1318.

Figure 14:
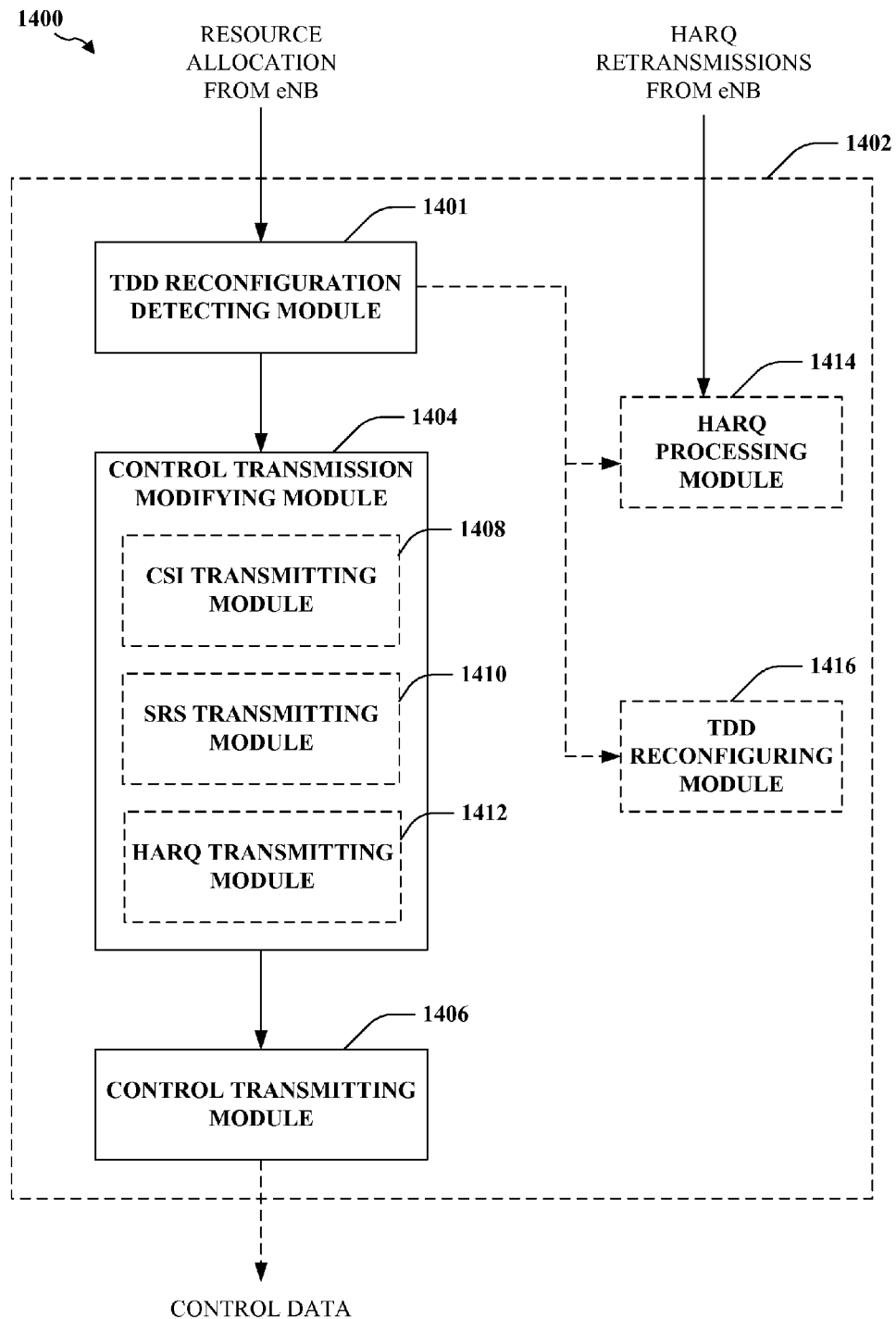
FIG. 14 illustrates an example apparatus for mitigating conflicts in TDD subframe reconfiguration.

FIG. 14 is a diagram 1400 illustrating an example apparatus 1402 for mitigating conflicts in TDD subframe reconfiguration. Apparatus 1402 can be a UE, such as UE 706 or 708, that communicates with one or more eNBs, such as eNBs 702 or 704, in a wireless network to receive access thereto, and can include additional modules than those depicted to facilitate such communicating. Apparatus 1402 can include a TDD reconfiguration detecting module 1401 for determining subframe reconfiguration of TDD based on resource allocation information from an eNB, a control transmission modifying module 1404 for modifying one or more aspects of communicating control data based on the TDD subframe reconfiguration, and a control transmitting module for communicating the control data based on the modified aspects. In addition, apparatus 1402 can optionally include a HARQ processing module 1414 for modifying one or more aspects of HARQ reception based on TDD subframe reconfiguration, and/or a TDD reconfiguring module 1416 for selecting a different TDD subframe configuration where conflicts or interference are detected.

According to an example, apparatus 1402 can communicate in a wireless network using a TDD subframe configuration assigned by an eNB. The eNB can reconfigure the TDD subframe configuration for apparatus 1402, which can be detected by TDD reconfiguration detecting module 1401. For example, TDD reconfiguration detecting module 1401 can detect the TDD subframe reconfiguration based on an allocation from the eNB that specifies a TDD subframe configuration to use in communicating with the eNB (e.g., which can be different from a previous TDD subframe configuration), based on an updated TDD subframe configuration received from the eNB in another indication or signal, and/or the like. Control transmission modifying module 1404 can modify one or more aspects for transmission of control data based on the TDD subframe reconfiguration, and control transmitting module 1406 can transmit control data to the eNB based on the one or more modified aspects.

In an example, with reference to Table 1, possible TDD subframe configurations can be one of the following:

TABLE 1

| UL-DL config-uration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| UL-DL config-uration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D | where 'D' indicates downlink transmission, 'U' indicates uplink transmission, and 'S' indicates special subframe, which can be used for uplink or downlink transmission. The apparatus 1402 can store such information regarding the TDD subframe configurations; thus, an eNB can communicate a configuration index (e.g., 0-6) to apparatus 1402 for the intended TDD subframe configuration. The apparatus 1402 can communicate according to the TDD subframe configuration, and in this example, TDD reconfiguration detecting module 1401 can detect the TDD subframe reconfiguration based on receiving a different index from the eNB (e.g., in a resource allocation or otherwise). It is to be appreciated that additional TDD subframe configurations can be defined and used.

In one example, control transmission modifying module 1404 can optionally include a CSI transmitting module 1408 for modifying one or more aspects of CSI transmission based on TDD subframe reconfiguration, an SRS transmitting module 1410 for similarly modifying one or more aspects of SRS transmission, and/or a HARQ transmitting module 1412 for modifying one or more aspects of HARQ transmission.

For example, CSI transmitting module 1408 can modify a periodicity of CSI transmission based on a determined TDD subframe reconfiguration. In a specific example, CSI transmission can include communicating channel quality indicator (CQI), precoding matrix indicator (PMI), rank indicator (RI), and/or similar feedback. With reference to Table 2, CSI transmitting module 1408 can transmit the CSI according to one of the following periodicities specified by the eNB or otherwise configured at apparatus 1402:

TABLE 2

| $I_{CQI/PMI}$ | Value of $N_{pd}$ | Value of $N_{OFFSET,\ CQI}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI} - 1$ |
| $6 \leq I_{CQI/PMI} \leq 15$ | 10 | $I_{CQI/PMI} - 6$ |
| $16 \leq I_{CQI/PMI} \leq 35$ | 20 | $I_{CQI/PMI} - 16$ |
| $36 \leq I_{CQI/PMI} \leq 75$ | 40 | $I_{CQI/PMI} - 36$ |
| $76 \leq I_{CQI/PMI} \leq 155$ | 80 | $I_{CQI/PMI} - 76$ |
| $156 \leq I_{CQI/PMI} \leq 315$ | 160 | $I_{CQI/PMI} - 156$ |
| $316 \leq I_{CQI/PMI} \leq 1023$ | | Reserved | where $I_{CQI/PMI}$ is a parameter cqi-pmi-ConfigIndex representing the configuration index of a CSI transmission periodicity received from the eNB, $N_{pd}$ is the periodicity (in subframes) corresponding to the index, and $N_{OFFSET,CQI}$ is the offset (in subframes) for CSI reporting. Thus, based on a received or otherwise determined index, CSI transmitting module 1408 can transmit CSI to the eNB according to the periodicity $N_{pd}$, based on offset $N_{OFFSET,CQI}$. Some of the above periodicities, however, may not be compatible with certain TDD subframe configurations. In this regard, upon TDD reconfiguration detecting module 1401 determining a TDD subframe reconfiguration, CSI transmitting module 1408 may modify the CSI periodicity to one compatible with the new TDD subframe configuration.

For instance, the reporting period of $N_{pd}=1$ is only applicable to TDD subframe configurations 0, 1, 3, 4, and 6, above, where all uplink (U) subframes in a radio frame are used for CQI/PMI reporting, but not to subframe configurations 2 or 5 because there may not be enough time to transmit the control data in a single uplink subframe. In addition, the reporting period of $N_{pd}=5$ is only applicable to TDD subframe configurations 0, 1, 2, and 6, but not subframe configurations 3, 4, or 5 because there may not be enough opportunities to transmit uplink control data every 5 subframes. The reporting periods of $N_{pd}=\{10, 20, 40, 80, 160\}$ are applicable to all TDD subframe configurations. For example, a CSI reporting conflict may occur where apparatus 1402 is assigned reporting period of $N_{pd}=5$ but TDD reconfiguration detecting module 1401 detects a switch to TDD subframe configuration 3 (which does not support an $N_{pd}=5$).

To cure such conflicts, in one example, the TDD reconfiguration detecting module 1401 can detect the conflict or otherwise receive a new CSI periodicity along with (or related to) the new TDD subframe configuration, as specified by the eNB. For example, detecting the conflict can include evaluating the TDD subframe configuration and aspects of the CSI. In another example, CSI transmitting module 1408 can drop CSI transmission during conflicting subframes, e.g., subframes previously correlated to a CSI transmission that are now scheduled for downlink transmission in the new TDD subframe configuration. In yet another example, CSI transmitting module 1408 can detect the conflict between CSI periodicity and a new TDD subframe configuration, and can accordingly use a next highest CSI periodicity. For example, where CSI transmitting module 1408 was using $N_{pd}=5$, the CSI transmitting module 1408 can switch to $N_{pd}=10$ based on detecting the conflict. Similarly, the CSI transmitting module 1408 can switch to the next lowest CSI periodicity.

In addition, CSI transmitting module 1408 can modify CSI content upon determining the TDD subframe reconfiguration. CSI content can include wideband CSI reporting, subband CSI reporting with or without precoding type indicator (PTI), etc. For example, CSI transmitting module 1408 can use the following rules for reporting CSI. In the case where wideband CSI reporting is configured, the reporting instances for wideband CSI are subframes satisfying:

$$(10 \times n_f + \lfloor n_s/2 \rfloor - N_{OFFSET,CQI}) \bmod(N_{pd}) = 0$$

where $n_f$ is a system frame number, and $n_s$ is a slot index within a radio frame. In case RI reporting is configured, the reporting interval of the RI reporting is an integer multiple $M_{RI}$ of period $N_{pd}$, in subframes. The reporting instances for RI can be subframes satisfying:

$$(10 \times n_f + \lfloor n_s/2 \rfloor + N_{OFFSET,CQI} - N_{OFFSET,RI}) \bmod (N_{pd} \cdot M_{RI}) = 0$$

Thus, the CSI transmitting module 1408 uses a hopping pattern to transmit CSI. Where TDD subframe reconfiguration is detected, CSI transmitting module 1408 can determine which reporting instances to use in view of the reconfiguration, whether the instances for the previous TDD subframe configuration as computed using the formula above, or the instances computed for the new TDD subframe configuration, etc. In one example, following TDD reconfiguration, CSI transmitting module 1408 can transmit CSI at a next instance computed for the previous TDD subframe configuration. In another example, following TDD reconfiguration determined by TDD reconfiguration detecting module 1401, CSI transmitting module 1408 can compute reporting instances for the new TDD subframe configuration and can transmit CSI using an instance that corresponds to the current subframe index. In yet another example, CSI transmitting module 1408 can reset the subframe configuration and instances for reporting CSI upon TDD reconfiguration detecting module 1401 determining the TDD subframe reconfiguration; thus, in this example, CSI transmitting module 1408 uses the initial reporting instance for the next CSI reporting following TDD subframe reconfiguration.

Moreover, in an example, CSI transmitting module 1408 can modify a priority of transmitting CSI based on detecting the TDD subframe reconfiguration. Some CSI values, such as RI and PTI, impact transmission of other CSI and control data and can be necessary for decoding such control data. Thus, the CSI transmitting module 1408 can determine the correct values for RI and PTI when the TDD subframe configuration is modified. In this regard, CSI transmitting module 1408 can use a previous RI and PTI, from before the detected TDD subframe reconfiguration, for the new TDD subframe configuration. In another example, CSI transmitting module 1408 can specify a new RI or PTI based on determining the TDD subframe reconfiguration. In yet another example, RI and PTI reporting can use a common subframe or common periodicity such that CSI transmitting module 1408 can use a previous RI or PTI following the TDD subframe reconfiguration until the opportunity to report a new RI and PTI for the TDD subframe reconfiguration. In a further example, CSI transmitting module 1408 can transmit RI and PTI using a lowest allowed rank, which may be subject to a precoding subset restriction (e.g., can only use rank 2-4). It is to be appreciated that CSI transmitting module 1408 can use a combination of one or more of the above examples in transmitting CSI based on a determined TDD subframe reconfiguration. It is to be appreciated that in the above and below examples, an eNB receiving the control data can similarly expect the related changes to control data transmissions.

Similarly, SRS transmitting module 1410 can modify SRS transmission periodicity based on a detected TDD subframe reconfiguration to avoid conflict caused by uplink SRS transmission periods in scheduled downlink subframes. In a specific example, with reference to Table 3, SRS transmission periodicity at apparatus 1402 can be one of the following:

TABLE 3

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ - 10 |
| 15-24 | 10 | $I_{SRS}$ - 15 |
| 25-44 | 20 | $I_{SRS}$ - 25 |
| 45-84 | 40 | $I_{SRS}$ - 45 |
| 85-164 | 80 | $I_{SRS}$ - 85 |
| 165-324 | 160 | $I_{SRS}$ - 165 |
| 325-644 | 320 | $I_{SRS}$ - 325 |
| 645-1023 | reserved | reserved |

Thus, an eNB can specify one of the above configuration indices for the apparatus 1402, and/or the apparatus 1402 can otherwise determine the SRS configuration index. SRS transmitting module 1410 can modify aspects of SRS transmission where TDD subframe reconfiguration may cause conflict therewith. This can be similar to the CSI modifications discussed above. Thus, for example, SRS transmitting module 1410 can at least one of receive an SRS configuration index corresponding to the new TDD subframe configuration from the eNB (e.g. in uplink pilot time slot (UpPTS)), drop SRS when transmission is not compatible with the new TDD subframe configuration in terms of subframe type, transmit SRS over a next available uplink subframe to avoid a conflict, automatically switch to a next highest or lowest configuration index, etc.

Similarly, SRS transmitting module 1410 can modify hopping over instances based on determining the TDD subframe reconfiguration. For example, SRS transmitting module 1410 can continue to use a hopping pattern for the previous TDD subframe configuration, use a new hopping pattern for the new TDD subframe configuration, reset the transmission instances based on detecting the TDD subframe reconfiguration, and/or the like.

In another example, HARQ processing module 1414 can modify a soft buffer for HARQ retransmissions received from an eNB. For each subframe where a transmission takes place for the HARQ process, one or two (in case of downlink spatial multiplexing) transport blocks and the associated HARQ information are received from the HARQ entity. Depending on the new transmission or old transmission, HARQ processing module 1414 stores or combines with old log likelihood ratios in the buffer. Depending on the decoding results, HARQ processing module 1414 sends acknowledgement (ACK) or non-ACK (HACK). Furthermore, both for FDD and TDD, if a UE is configured with more than one serving cell, then for each serving cell, for at least $K_{MIMO} \cdot \min(M_{DL\_HARQ}, M_{limit})$ transport blocks, upon decoding failure of a code block of a transport block, the UE can store received soft channel bits corresponding to a range of at least $w_k, w_{k+1}, \ldots, w_{mod(k+n_{SB}-1, N_{cb})}$, where:

$$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right),$$

where $N_{cb}$ is the soft buffer size, $N_{cb}$ is the code block buffer size as defined in the LTE standard, $N'_{soft}$ is the total number of soft channel bits (e.g., based on a UE category), C is a the number of code blocks, $N_{cells}^{DL}$ is the number of downlink cells, $K_{MIMO}$ relates to whether MIMO is active (e.g., a number of MIMO resources), $M_{DL\_HARQ}$ is the maximum number of downlink HARQ processes, $M_{limit}$ is a constant.

Different TDD subframe configurations can have different downlink HARQ processes; thus, HARQ processing module 1414 can attempt to avoid ambiguity in the soft buffer size caused by determining the soft buffer size for HARQ processing when transitioning between TDD subframe configurations. In one example, if there is unfinished HARQ transmission, HARQ processing module 1414 can use the previous HARQ process until the transmission is finished (e.g., uses $M_{DL\_HARQ}$ of the previous TDD subframe configuration for determining the soft buffer size, which can minimize loss of the previous HARQ). In another example, HARQ processing module 1414 can use a soft buffer size related to the new TDD subframe configuration (e.g., computed using $M_{DL\_HARQ}$ of the new TDD subframe configuration) immediately upon transitioning from the TDD subframe configuration. Thus, for example, HARQ processing module 1414 can use a configuration dependent $M_{DL\_HARQ}$ to determine the soft buffer size. In another example, a static or semi-static soft buffer size can be used during the transition (e.g., computed based on $M_{limit}$, or allow radio resource control (RRC) configured fixed number instead of $\min\{M_{limit}, M_{DL\_HARQ}\}$) to simplify the HARQ process. Moreover, in an example, HARQ processing module 1414 can use the static or semi-static soft buffer size during TDD subframe configuration transitions while using a dynamic size outside of transition. For instance, the HARQ processing module 1414 can select or compute the dynamic size based on an RRC defined set of parameters.

In yet another example, apparatus 1402 can communicate with the eNB (and/or other eNBs) over multiple carriers in carrier aggregation. In a specific example in LTE, physical uplink control channel (PUCCH) format 3 or PUCCH format 1b with channel selection can be configured for apparatus 1402. For format 3, HARQ transmitting module 1412 concatenates ACK information bits from different cells. Where scheduling request is on the same subframe, it is further concatenated to the end. In addition, the HARQ transmitting module 1412 determines ACK/NACK bit width semi-statically based on the configured DL modes for each component carrier (CC) in CA, and the number of semi-statically configured CCs, and CC activation/deactivation does not impact the ACK/NACK bit width (referred to as codebook size). Thus, in the case of adaptive TDD subframe reconfiguration over multiple carriers, the HARQ transmitting module 1412 can determine the codebook size by assuming a larger of the configurations of the two TDD subframe configurations. In another example, HARQ transmitting module 1412 can determine the codebook size by using the different sizes during transition, as determined by the downlink modes and CCs before and after the transition. In yet another example, HARQ transmitting module 1412 can refrain from changing feedback mode during the transition. For instance, if TDD reconfiguration detecting component receives a switch to a subframe configuration that is incompatible with PUCCH format of the previous TDD subframe configuration, it can ignore TDD configuration.

TDD reconfiguring module 1416 can reconfigure apparatus 1402, which can include configuring a transceiver thereof, to use a new TDD subframe configuration received from the eNB. In another example, TDD reconfiguration detecting module 1401 can obtain a set of reconfiguration possibilities. Where TDD reconfiguration detecting module 1401 determines that an assigned TDD subframe reconfiguration may cause conflict with current CSI transmissions, TDD reconfiguration detecting module 1401 can evaluate a next configuration in a received set of TDD subframe configurations until a desirable configuration is obtained. For example, TDD reconfiguration detecting module 1401 can determine such conflicts based on evaluating the new TDD subframe configuration against periodicities configured for transmitting control data, other control processes, etc., as described. In another example, TDD reconfiguration detecting module 1401 can receive separate TDD subframe configurations for CSI transmission and data transmissions. In either case, TDD reconfiguring module 1416 can configure apparatus 1402 or related transceiver or other component to use the received or determined TDD subframe configuration.

The apparatus may include additional modules that perform each of the steps of the algorithm in the aforementioned flow charts of FIGS. 8 and 9. As such, each step in the aforementioned flow charts of FIGS. 8 and 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
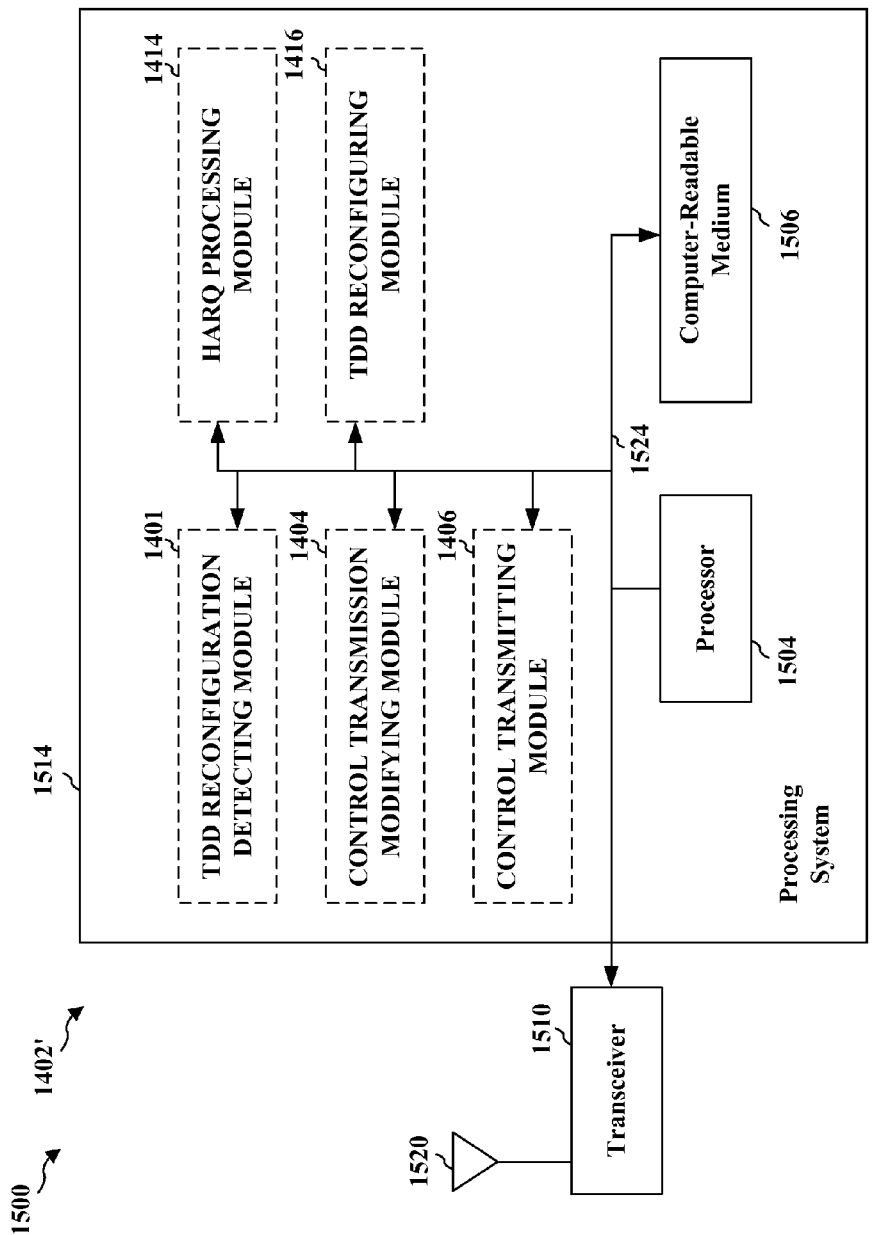
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1401, 1404, 1406, 1414, 1416, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514. In addition, the transceiver 1510 receives information from the processing system 1514, and based on the received information, generates a signal to be applied to the one or more antennas 1520. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1401, 1404, 1406, 1414, 1416. The modules may be software modules running in the processor 1504, resident/stored in the computer readable medium 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402/1402' for wireless communication includes means for detecting a TDD subframe reconfiguration, means for modifying at least one aspect of a CSI or an SRS transmission based on the TDD subframe reconfiguration, means for detecting a different TDD subframe reconfiguration for a data transmission, means for modifying the data transmission based on the different TDD subframe reconfiguration, and means for modifying at least a HARQ soft buffer size or a codebook size for a HARQ process based on the TDD subframe reconfiguration.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method performed by a user equipment (UE) for configuring control data communications based on a time division duplexing (TDD) subframe reconfiguration, comprising:

detecting a TDD subframe reconfiguration from a first TDD subframe configuration to a second TDD subframe configuration;

detecting a scheduling conflict with a scheduled channel state information (CSI) transmission or a sounding reference signal (SRS) transmission based on the TDD subframe reconfiguration; and modifying at least one aspect of the CSI transmission or the SRS transmission based on the TDD subframe reconfiguration, comprising modifying a periodicity of the CSI or the SRS transmission of the second TDD subframe configuration, wherein the modifying the periodicity comprises dropping at least one instance of the CSI or SRS transmission based on the detected scheduling conflict with the TDD subframe reconfiguration.

2. The method of claim 1, wherein the modifying the periodicity further comprises utilizing a configuration corresponding to a next lowest or highest configuration index related to the CSI or the SRS transmission.

3. The method of claim 1, wherein the modifying comprises modifying a content of the CSI or the SRS transmission.

4. The method of claim 3, wherein the modifying the content comprises computing a subband for transmitting the CSI or the SRS transmission based on at least one of a TDD subframe configuration before the TDD subframe reconfiguration or a TDD subframe configuration after the TDD subframe reconfiguration.

5. The method of claim 1, wherein the modifying comprises modifying a rank indicator (RI) or a precoding type indicator (PTI) related to the CSI or the SRS transmission.

6. The method of claim 5, wherein the modifying the RI or the PTI comprises using at least one of a previous RI or PTI from a TDD subframe configuration before the TDD subframe reconfiguration, a previous RI or PTI from a TDD subframe configuration after the TDD subframe reconfiguration, a common RI or PTI for the TDD subframe reconfiguration, or a lowest allowed RI or PTI.

7. The method of claim 1, wherein the modifying comprises selecting the next TDD subframe reconfiguration in a set of received TDD subframe reconfigurations based on detecting the conflict between the CSI or the SRS transmission and the TDD subframe reconfiguration.

8. The method of claim 1, wherein the modifying the comprises:
   detecting the different TDD subframe reconfiguration for the data transmission; and
   modifying the data transmission based on the different TDD subframe reconfiguration.

9. A user equipment for configuring control data communications based on a time division duplexing (TDD) subframe reconfiguration, comprising:
   means for detecting a TDD subframe reconfiguration from a first TDD subframe configuration to a second TDD subframe configuration;
   means for detecting a scheduling conflict with a scheduled channel state information (CSI) transmission or a sounding reference signal (SRS) transmission based on the TDD subframe reconfiguration; and
   means for modifying at least one aspect of the CSI transmission or the SRS transmission based on the TDD subframe reconfiguration, including
      modifying a periodicity of the CSI or the SRS transmission of the second TDD subframe configuration, wherein the modifying the periodicity comprises dropping at least one instance of the CSI or SRS transmission based on the detected scheduling conflict with the TDD subframe reconfiguration.

10. The user equipment of claim 9, wherein the modifying comprises modifying a content of the CSI or the SRS transmission.

11. The user equipment of claim 10, wherein the modifying the content comprises computing a subband for transmitting the CSI or the SRS transmission based on at least one of a TDD subframe configuration before the TDD subframe reconfiguration or a TDD subframe configuration after the TDD subframe reconfiguration.

12. The user equipment of claim 9, wherein the modifying comprises modifying a rank indicator (RI) or a precoding type indicator (PTI) related to the CSI or the SRS transmission.

13. The user equipment of claim 12, wherein the modifying the RI or the PTI comprises using at least one of a previous RI or PTI from a TDD subframe configuration before the TDD subframe reconfiguration, a previous RI or PTI from a TDD subframe configuration after the TDD subframe reconfiguration, a common RI or PTI for the TDD subframe reconfiguration, or a lowest allowed RI or PTI.

14. The user equipment of claim 9, wherein the modifying comprises selecting the next TDD subframe reconfiguration in a set of received TDD subframe reconfigurations based on detecting the conflict between the CSI or the SRS transmission and the TDD subframe reconfiguration.

15. The user equipment of claim 9, wherein the means for modifying comprises:
   means for detecting the different TDD subframe reconfiguration for the data transmission; and
   means for modifying the data transmission based on the different TDD subframe reconfiguration.

16. A user equipment for configuring control data communications based on a time division duplexing (TDD) subframe reconfiguration, comprising:
   a memory; and
   at least one processor coupled to the memory and configured to:
      detect a TDD subframe reconfiguration from a first TDD subframe configuration to a second TDD subframe configuration;
      detect a scheduling conflict with a scheduled channel state information (CSI) transmission or a sounding reference signal (SRS) transmission based on the TDD subframe reconfiguration; and
      modify at least one aspect of the CSI transmission or the SRS transmission based on the TDD subframe reconfiguration, comprising
         modifying a periodicity of the CSI or the SRS transmission of the second TDD subframe configuration, wherein the modifying the periodicity comprises dropping at least one instance of the CSI or SRS transmission based on the detected scheduling conflict with the TDD subframe reconfiguration.

17. The user equipment of claim 16, wherein the modifying comprises modifying a content of the CSI or the SRS transmission.

18. The user equipment of claim 17, wherein the modifying the content comprises computing a subband for transmitting the CSI or the SRS transmission based on at least one of a TDD subframe configuration before the TDD subframe reconfiguration or a TDD subframe configuration after the TDD subframe reconfiguration.

19. The user equipment of claim 16, wherein the modifying comprises modifying a rank indicator (RI) or a precoding type indicator (PTI) related to the CSI or the SRS transmission.

20. The user equipment of claim 19, wherein the modifying the RI or the PTI comprises using at least one of a previous RI or PTI from a TDD subframe configuration before the TDD subframe reconfiguration, a previous RI or PTI from a TDD subframe configuration after the TDD subframe reconfiguration, a common RI or PTI for the TDD subframe reconfiguration, or a lowest allowed RI or PTI.

21. The user equipment of claim 16, wherein the modifying comprises selecting the next TDD subframe reconfiguration in a set of received TDD subframe reconfigurations based on detecting the conflict between the CSI or the SRS transmission and the TDD subframe reconfiguration.

22. The user equipment of claim 16, wherein the at least one processor is configured to:
    detect a different TDD subframe reconfiguration for the data transmission; and
    modify the data transmission based on the different TDD subframe reconfiguration.

23. A non-transitory computer-readable medium storing computer executable code comprising code for:
    detecting a time division duplexing (TDD) subframe reconfiguration from a first TDD subframe configuration to a second TDD subframe configuration;
    detecting a scheduling conflict with a scheduled channel state information (CSI) transmission or a sounding reference signal (SRS) transmission based on the TDD subframe reconfiguration; and
    modifying at least one aspect of the CSI transmission or the SRS transmission based on the TDD subframe reconfiguration, including at least one of
    modifying a periodicity of the CSI or the SRS transmission of the second TDD subframe configuration, wherein the modifying the periodicity comprises dropping at least one instance of the CSI or SRS transmission based on the detected scheduling conflict with the TDD subframe reconfiguration.

24. The computer-readable medium of claim 23, wherein the modifying comprises modifying a content of the CSI or the SRS transmission.

25. The computer-readable medium of claim 24, wherein the modifying the content comprises computing a subband for transmitting the CSI or the SRS transmission based on at least one of a TDD subframe configuration before the TDD subframe reconfiguration or a TDD subframe configuration after the TDD subframe reconfiguration.

26. The computer-readable medium of claim 23, wherein the modifying comprises modifying a rank indicator (RI) or a precoding type indicator (PTI) related to the CSI or the SRS transmission.

27. The computer-readable medium of claim 26, wherein the modifying the RI or the PTI comprises using at least one of a previous RI or PTI from a TDD subframe configuration before the TDD subframe reconfiguration, a previous RI or PTI from a TDD subframe configuration after the TDD subframe reconfiguration, a common RI or PTI for the TDD subframe reconfiguration, or a lowest allowed RI or PTI.

28. The computer-readable medium of claim 23, wherein the modifying comprises selecting the next TDD subframe reconfiguration in a set of received TDD subframe reconfigurations based on detecting the conflict between the CSI or the SRS transmission and the TDD subframe reconfiguration.

29. The computer-readable medium of claim 23, wherein the modifying comprises:
    detecting the different TDD subframe reconfiguration for the data transmission; and
    modifying the data transmission based on the different TDD subframe reconfiguration.

30. The method of claim 1, wherein a TDD subframe reconfiguration includes changing from a first TDD subframe configuration to a second TDD subframe configuration.

31. The method of claim 30, further comprising:
    detecting a scheduling conflict between a first SRS transmission scheduled based on the first TDD subframe configuration and a second SRS transmission scheduled based on the second TDD subframe configuration; and
    modifying the periodicity of the SRS transmission, wherein the modifying the periodicity comprises dropping at least one instance of the SRS transmission based on the detected scheduling conflict with the TDD subframe reconfiguration.

32. The method of claim 30, further comprising:
    detecting a scheduling conflict between a first CSI transmission scheduled based on the first TDD subframe configuration and a second CSI transmission scheduled based on the second TDD subframe configuration; and
    modifying the periodicity of the CSI transmission, wherein the modifying the periodicity comprises dropping at least one instance of the CSI transmission based on the detected scheduling conflict with the TDD subframe reconfiguration.

33. The apparatus of claim 9, wherein the modifying the periodicity further comprises utilizing a configuration corresponding to a next lowest or highest configuration index related to the CSI or the SRS transmission.

34. The apparatus of claim 16, wherein the modifying the periodicity further comprises utilizing a configuration corresponding to a next lowest or highest configuration index related to the CSI or the SRS transmission.

35. The computer-readable medium of claim 23, wherein the modifying the periodicity further comprises utilizing a configuration corresponding to a next lowest or highest configuration index related to the CSI or the SRS transmission.

* * * * *